(12) United States Patent
Bellasalma et al.

(10) Patent No.: US 6,702,566 B1
(45) Date of Patent: Mar. 9, 2004

(54) LOCK ASSEMBLY FOR A LOW PRESSURE MOLD

(75) Inventors: Gerard Jay Bellasalma, Yorba Linda, CA (US); Joon Taek Kim, West Hollywood, CA (US); Lloyd Ramsey, Winters, CA (US)

(73) Assignee: Masco Corporation, Taylor, MI (US)

( * ) Notice: Subject to any disclaimer, the term of this patent is extended or adjusted under 35 U.S.C. 154(b) by 155 days.

(21) Appl. No.: 09/864,839

(22) Filed: May 24, 2001

(51) Int. Cl.$^7$ ............................................. B29C 33/20
(52) U.S. Cl. ..................................... 425/451.9; 425/435
(58) Field of Search ............................. 425/435, 451.9

(56) References Cited

U.S. PATENT DOCUMENTS

| | | | |
|---|---|---|---|
| 3,188,692 A | * 6/1965 | Traeger | 249/167 |
| 3,920,364 A | * 11/1975 | Cadogan-Rawlinson et al. | 425/450.1 |
| 3,947,196 A | * 3/1976 | Tribbett et al. | 425/451.9 |
| 4,563,139 A | 1/1986 | Yokoyama et al. | |
| 4,686,129 A | 8/1987 | Yokoyama et al. | |
| 5,156,818 A | * 10/1992 | Manchak et al. | 425/435 |
| 5,186,953 A | * 2/1993 | Minaudo | 425/451.9 |
| 5,306,137 A | * 4/1994 | Kitamura | 425/435 |
| 5,316,458 A | * 5/1994 | Lesneski | 425/451.9 |
| 5,375,991 A | * 12/1994 | Rydmann et al. | 425/451.9 |
| 5,439,369 A | 8/1995 | Wang | |
| 5,456,588 A | * 10/1995 | Yonekubo et al. | 425/595 |
| 5,486,103 A | 1/1996 | Meiring et al. | |
| 5,662,946 A | 9/1997 | Pratt et al. | |
| 5,762,977 A | 6/1998 | Boskovic | |
| 5,869,109 A | 2/1999 | Guzikowski | |
| 6,220,848 B1 | * 4/2001 | Kaselow et al. | 425/595 |
| 6,264,458 B1 | * 7/2001 | Marcuz et al. | 425/451.9 |

* cited by examiner

*Primary Examiner*—James P. Mackey
(74) *Attorney, Agent, or Firm*—Carlson, Gaskey & Olds (57) ABSTRACT

A lock assembly for a low pressure mold assembly includes a pin which extends from the first mold portion to be received into a female lock member. The female lock member includes a movable lock plate having a key-hole shaped opening. An actuator selectively moves the lock plate relative to the second mold portion between an unlocked and a locked position. In another embodiment, the lock assembly includes a female lock member mounted to the first mold portion and a male lock member mounted to the second mold portion. The female lock member includes a fixed bracket having a pair of parallel plates each having a substantially hook-shaped opening. The male lock member includes a linear actuator to drive an engagement member into and out of the hook-shaped opening to provide a locked and an unlocked position. A swing actuator drives the linear actuator through an arc such that the engagement portion of the linear actuator clears the female lock member to separate the mold portions.

15 Claims, 6 Drawing Sheets

LOCK ASSEMBLY FOR A LOW PRESSURE MOLD

BACKGROUND OF THE INVENTION

The present invention relates to a molding system, and more particularly to a lock assembly for a low pressure mold assembly.

Many molding systems provide for the mixing of at least two fluid materials to form a hardenable or settable mixture which can be discharged into a mold cavity in the formation of an article molded of synthetic resin. One particular mixture includes three components, a catalyst, a matrix polymer and a foaming agent. The fluid materials are fed from a multiple of supplies by a delivery or feed assembly which communicates with a mixing head. All the fluid materials are mixed in the mixing head and discharged into the mold cavity to form the molded article.

In high production facilities problems can arise in connection with the opening and closing of molds. To achieve a tight joint the art had previously used various bolting systems or presses. However, such bolting systems are labor intensive and time consuming to use while the presses are rather large and complex. Moreover, if the bolts/nuts were not evenly tightened there could be uneven wear at the mold joint and/or instances of seepage at the joint. Similar seepage problems occur in the press-type systems if continued pressure is not applied thereto.

Accordingly, it is desirable to provide a lock assembly which provides a counter force to assure that the mold portions are proper and securely closed. It is further desirable to provide a lock assembly which is remotely activated such that the molds may be rapidly opened and closed in an assembly-line environment.

SUMMARY OF THE INVENTION

A low pressure mold assembly includes a first mold portion and a second mold portion which are selectively retained together by a lock assembly. In one embodiment, the lock assembly includes a male lock member mounted to the first mold portion and a female lock member mounted to the second mold portion. The male lock member is preferably a fixed pin which extends from the first mold portion to be received into the female lock member. The female lock member includes a movable lock plate having a key-hole shaped opening. An aperture through the second mold portion is sized to receive the outer diameter of the pin therethrough for engagement by the lock plate.

An actuator selectively moves the lock plate relative to the second mold portion between an unlocked and a locked position and to provide a counter force to the pressure within a filling mold. In the unlocked position, the relatively larger opening of the key-hole shaped opening is aligned with the aperture such that the pin is receivable through the second mold portion. In the locked position, the relatively smaller opening of the key-hole shaped opening is aligned with the aperture such that the lock plate captures the circumferential groove.

In another embodiment, the lock assembly includes a female lock member mounted to the first mold portion and a male lock member mounted to the second mold portion. The female lock member includes a fixed bracket having a pair of parallel plates each having a substantially hook-shaped opening. The male lock member includes a linear actuator to drive an engagement portion into the hook-shaped openings. A swing actuator drives the linear actuator through an arc such that the engagement portion of the linear actuator clears the female lock member for separation of the mold portions.

Accordingly, the present invention provides a lock assembly which provides a counter force assures the mold portions are proper and securely closed and are remotely activated such that the molds may be rapidly opened and closed in an assembly-line environment.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
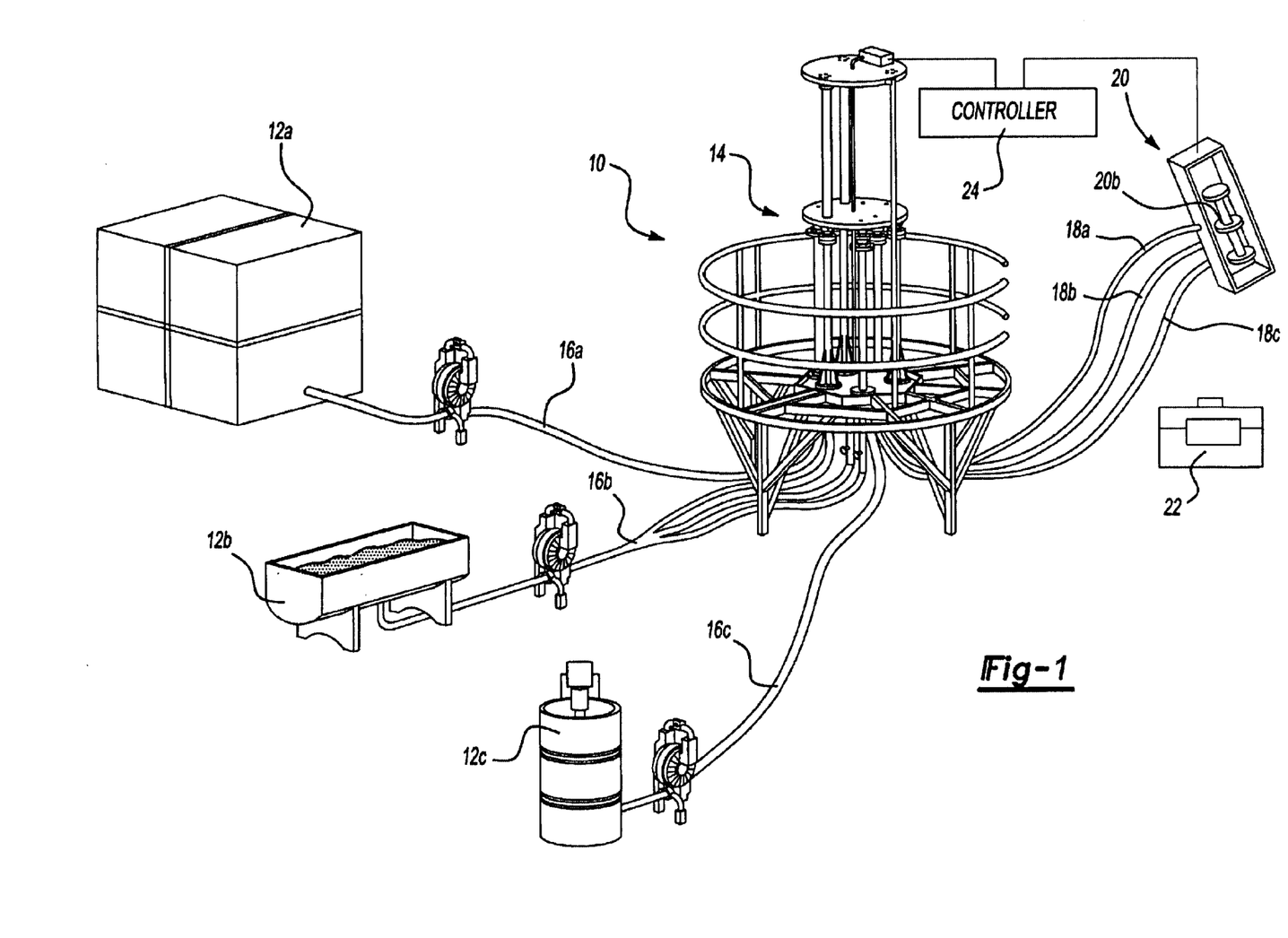
FIG. 1 is a simplified schematic representation of a multiple material molding system.

FIG. 1 schematically illustrates a multiple material molding system 10. The system 10 generally includes a plurality of fluid material supplies 12A, 12B and 12C, which communicate with a feed assembly 14 through respective supply conduits 16A, 16B, 16C. The feed assembly 14 drives a desired quantity of fluid material from each fluid material supply 12A–12C through output conduits 18A–18C and to a mix head assembly 20. The mix head assembly 20 thoroughly mixes the fluid material from the feed assembly 14 and injects the final mixture into a low-pressure mold assembly 22. As the materials chemically cure, the mold assembly 22 experience a relatively low internal pressure of approximately 2–10 psi.

Preferably, a controller 24 communicates with the feed assembly 14, mix head assembly 20, and mold assembly 22 to assure the system 10 is operating within predefined parameters. Controls for injection-molding equipment are known in the art and further description of the algorithms will not be further detailed herein. System 10 is preferably utilized for injection molding of very large parts, and in particular bathtubs and shower surrounds.

Figure 2:
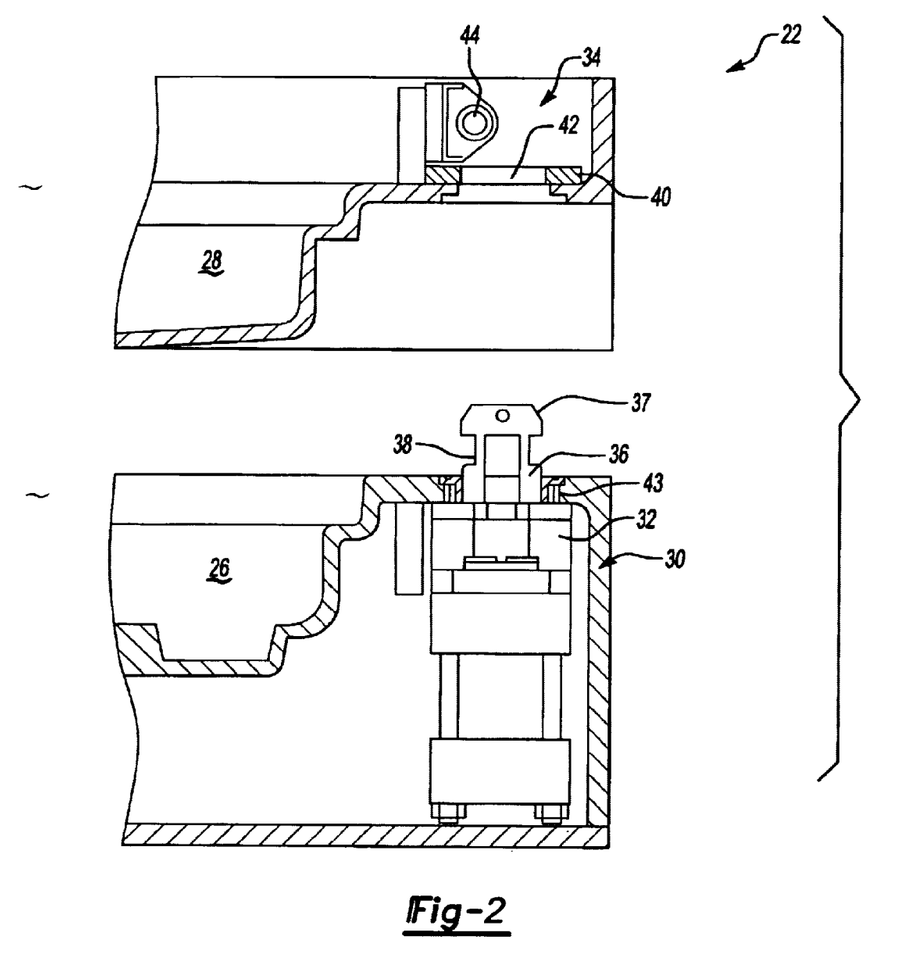
FIG. 2 is an exploded partial perspective view of a low pressure mold assembly according to the present invention.

Referring to FIG. 2, the mold assembly 22 includes a first mold portion 26 and a second mold portion 28 which are selectively retained together by a lock assembly 30. It should be understood that although only a single lock assembly will be described in the disclosed embodiment, a plurality of lock assemblies are preferably arranged about the perimeter of the mold assembly 22. In one embodiment, the lock assembly 30 includes a male lock member 32 mounted to the first mold portion 26 and a female lock member 34 mounted to the second mold portion 28.

The male lock member 32 is preferably a fixed pin 36 which extends from the first mold portion 26 to be received into the female lock member 32. The pin 36 includes a circumferential groove 38. An end segment 37 of the pin 36 is preferably of a frustro-conical shape to assist in receiving the pin 36 through the female lock member 32.

Figure 3A:
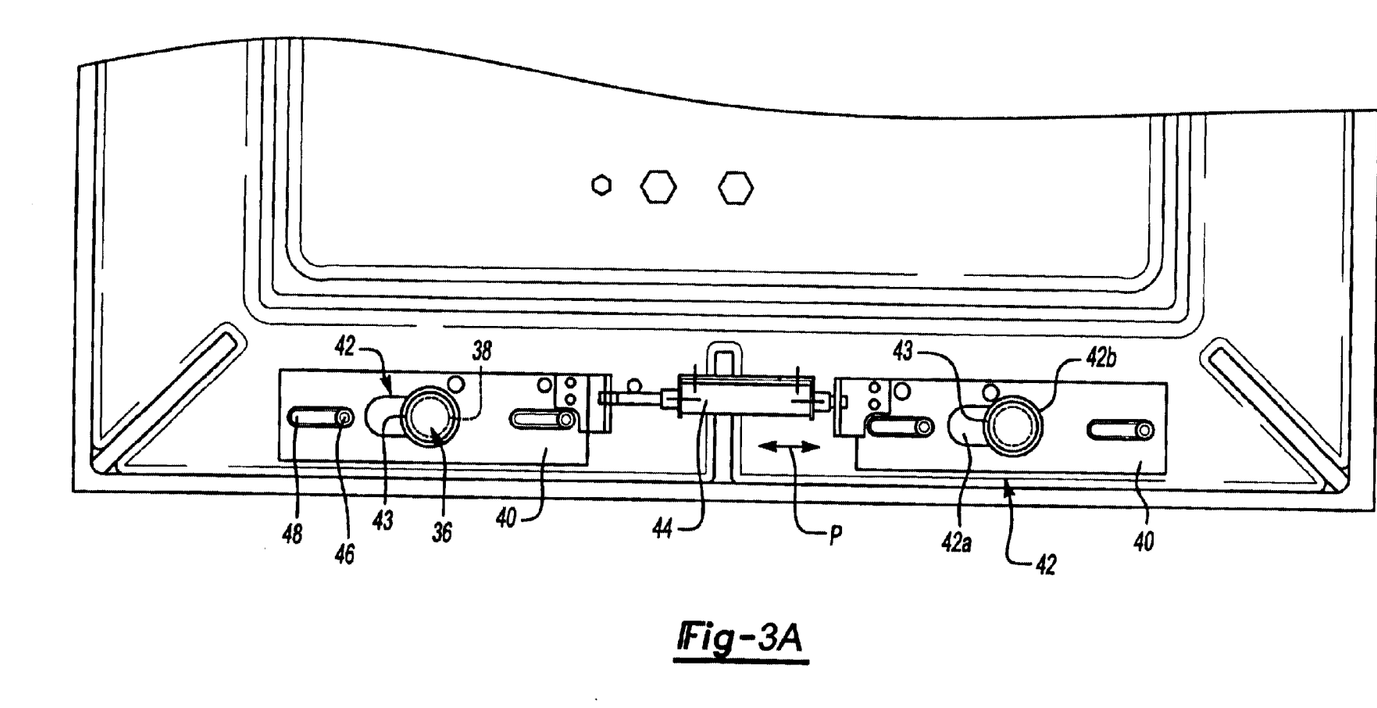
FIG. 3A is a top view of the lock assembly of FIG. 2 illustrated in an unlocked position.
Figure 3B:
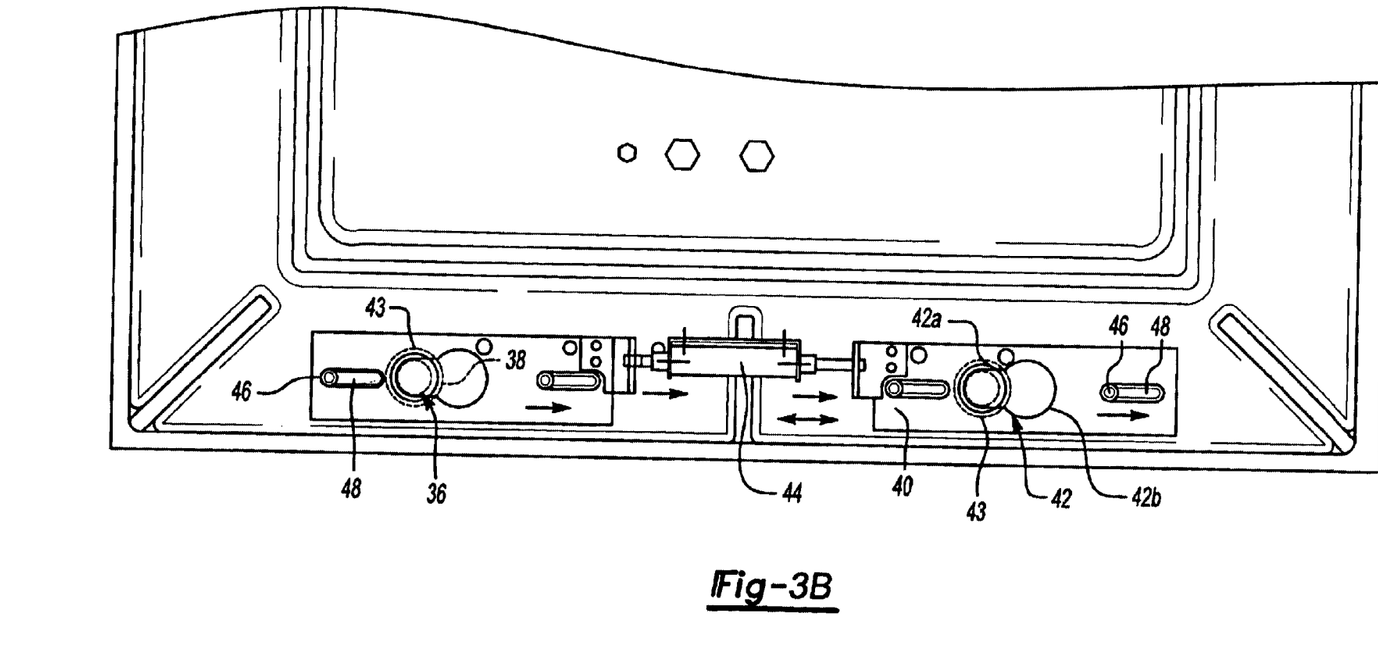
FIG. 3B is a top view of the lock assembly of FIG. 2 illustrated in a locked position.

Referring to FIG. 3A, the female lock member 32 is preferably a movable lock plate 40 having a key-hole shaped opening 42 (FIGS. 3A, 3B). In other words, the opening 42 includes an adjoined relatively smaller opening 42a and a relatively larger opening 42b. The relatively smaller opening 42a is sized to receive the outer diameter of circumferential groove 38 while being smaller than the outer diameter of the pin 36. The relatively larger opening 42b is sized to receive the outer diameter of the pin 36. An aperture 43 through the second mold portion is sized to receive the outer diameter of the pin 36 therethrough for engagement by the lock plate 40.

An actuator 44 such as a pneumatic, hydraulic, mechanical, or electrical actuator selectively moves (schematically illustrated by double-headed arrow P) the lock plate 40 relative to the second mold portion 28 between an unlocked (FIG. 3A) and a locked position (FIG. 3B). A guide pin 46 is preferably movable within a slot 48 in the lock plate 40 to assure the guide plate 40 is maintained in a proper orientation relative to the pin 36.

In the unlocked position, the relatively larger opening 42b is aligned with the aperture 43 (FIG. 3A) such that the pin 36 is receivable through the second mold portion 28. In the locked position (FIG. 3B), the relatively smaller opening 42a is aligned with the aperture 43 such that the lock plate 40 captures the circumferential groove 38. Contact between the lock plate 40 and the second mold portion 28 is a surface contact. A solid lock is thereby achieved as any force which is applied which may separate the first and second mold portions 26,26 during filling of the mold assembly 22, is distributed from the pin 36 to the entire lock plate 40.

Preferably a single actuator 44 is connected between two lock plates 40 such that extension of the actuator simultaneously drives the two lock plates into the locked position which provides a counter force during mold filling. The controller 24 communicates with the actuator 44 to operate the lock assemblies 30. Further, although providing an effective counter-force, the inventive locking arrangement only requires that the actuator 44 to move the lock plate 40 and not actually provide any locking function between the separate first and second mold portions 26,26. A relatively low power actuator 44 is therefore particularly applicable to advantageously provide the counterforce.

Figure 4:
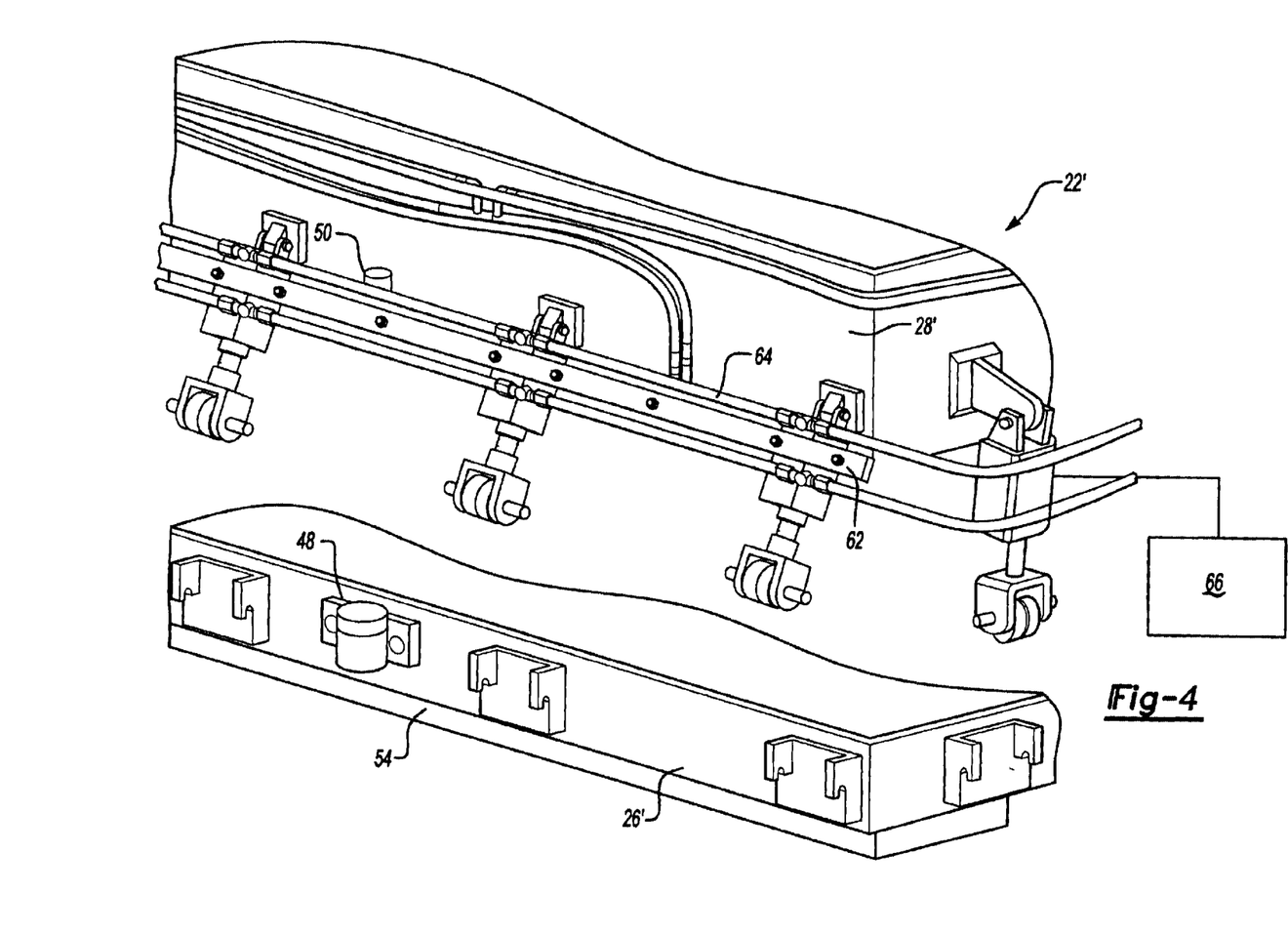
FIG. 4 is an exploded partial perspective view of another low pressure mold assembly according to the present invention.

Referring to FIG. 4, the mold assembly 22' includes a first mold portion 26' and a second mold portion 28' which are selectively retained together by a lock assembly 46. In another embodiment, the lock assembly 46 includes a female lock member 48 mounted to the first mold portion 26' and a male lock member 50 mounted to the second mold portion 28'.

Figure 5A:
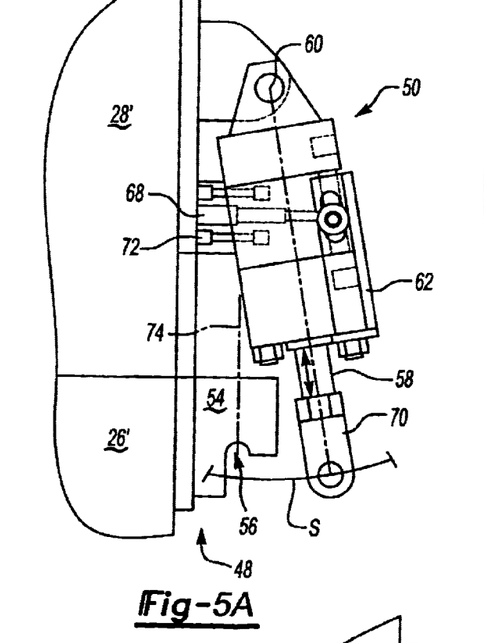
FIG. 5A is a side view of the lock assembly of FIG. 4 illustrated in an unlocked position.
Figure 5B:
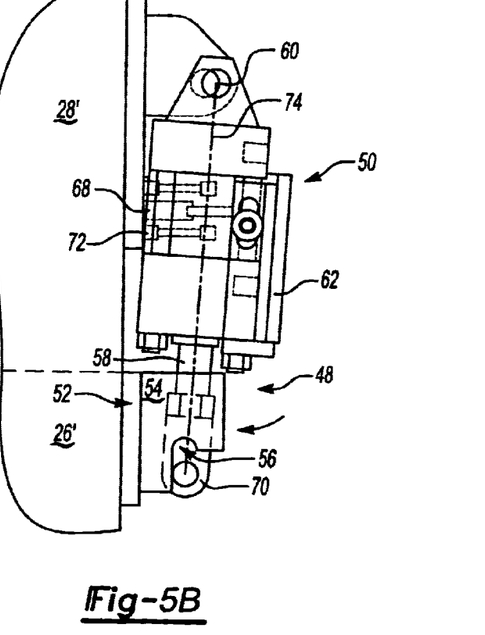
FIG. 5B is a side view of the lock assembly of FIG. 4 illustrated in an intermediate position.
Figure 5C:
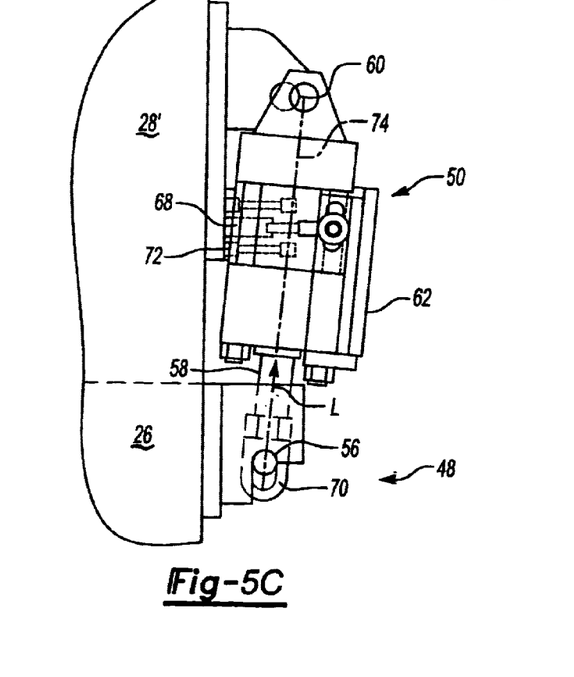
FIG. 5C is a side view of the lock assembly of FIG. 4 illustrated in a locked position.

The female lock member 48 includes a fixed bracket 52 having a pair of parallel plates 54 each having an identical substantially hook-shaped opening 56 (FIGS. 5A–5C). The bracket 52 is preferably welded to the first mold portion 26 to assure a solid mount.

The male lock member 50 includes a linear actuator 58 such as a pneumatic, hydraulic, mechanical, magnetic or electrical actuator to move the male lock member between an unlocked (FIG. 5A) and a locked (FIG. 5C) position. The linear actuator 58 is pivotally mounted to the second mold portion 28' at a pivot 60. Preferably, a common member 62 interconnects a plurality of male lock members 50. Common member 62 further provides for the mounting of a supply conduit 64 or the like such that each linear actuator 58 is simultaneously operable in response to a power source (illustrated schematically at 66) controlled by the controller 24 (FIG. 1).

A swing actuator 68 such as a pneumatic, hydraulic, mechanical, magnetic, or electrical actuator is mounted between the second mold portion 28' and the common member 62. Operation of the swing actuator 68 drives the linear actuator 58 through an arc S (FIG. 5A). Common member 62 further allows a lesser number of swing actuators 68 to swing a greater number of male lock members 50 in unison. As the swing actuator 68 only swings the male lock members 50 and do not actually provide any locking function between the first and second mold portions 26',28' a relatively low power swing actuator 68 is particularly applicable.

The linear actuator 58 includes an engagement portion 70 which is receivable within the substantially hook-shaped opening 56. The engagement portion 70 is preferably a substantially T-shaped member which extends between and engages each of the pair of parallel plates 54.

Referring to FIG. 5A, the male lock member 50 is illustrated an unlocked position The swing actuator 68 is extended to drive the linear actuator 58 through arc S defined by pivot 60. Preferably, a stop 72 such as a telescopic member limits swing arc S. The linear actuator 58 is swung away from the first mold portion 26 upon extension of the swing actuator 68 such that the engagement portion 70 clear the female lock member 48 until limited by stop 72. The mold portions 26',28' may then be separated.

Referring to FIG. 5B, the male lock member 50 is illustrated in an intermediate position. The swing actuator 68 is retracted to drive the linear actuator 58 through arc S toward the first mold portion 26' until the engagement member 70 contacts the plates 59 to limit swing arc S such that the linear actuator 58 is alienable along an axis 74. Axis 74 is defined by the alignment of the engagement portion 70 with the substantially hook-shaped opening 56 of the female lock member 48.

Once aligned along axis 74, the linear actuator 58 is driven toward the female lock member 48 (arrow L) and the engagement portion 70 enters the substantially hook-shaped opening 56 to lock the mold portions 26',28' (FIG. 5C). A solid lock is thereby achieved which provides a counter force when the mold is being filled The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A low pressure mold assembly comprising:
a first mold portion;
a second mold portion engageable with said first mold portion;

a first male lock member extending from said first mold portion;

a second male lock member extending from said first mold portion; a female lock member slidable relative to said second mold portion, said female lock member including a first lock plate having an fast opening to receive said first female lock member and a second lock plate having a second opening to receive said second male lock member; and an actuator mounted to said first and second lock plate to drive said first and second lock plate between a locked position to secure said first mold portion to said second portion and an unlocked position said first and second lock plate comprise a slot such that said first and second lock plate are moveable relative a guide pin extending from said second mold portion.

2. The mold assembly as recited in claim 1, wherein said first and second male lock each comprise a pin having a circumferential groove to receive said respective first and second lock plate.

3. The mold assembly as recited in claim 2, wherein said first and second pin receives said first and second lock plate in a substantially perpendicular relationship.

4. The mold assembly as recited in claim 1, said first and second male lock member each comprise a frustro-conical portion.

5. The molded assembly as recited in claim 1, wherein said first and second opening is substantially key-hole shaped.

6. The mold assembly as recited in claim 1, wherein each of said first and second openings includes a respectively larger opening to receive said pin one of said first and second male lock member respectively and a relatively smaller opening to engage a circumferential groove about said each of said first and second male lock member respectively.

7. The mold assembly as recited in claim 1, wherein said actuator operable to simultaneously drive said first lock plate and said second lock plate between said position and said unlocked position.

8. A low pressure mold assembly comprising:

a first mold portion;

a second mold portion engageable with said first mold potion;

a first lock pin having a circumferential groove, said first lock pin extending from said first mold portion;

a second lock pin having a circumferential groove, said second pock pin extending from said first mold portion;

a first lock plate having a first key-hole shaped opening slidable relative to a first aperture through said second mold portion, said first lock pin extendable through said first aperture and said first key-hole shaped opening such that said first lock plate is engageable with said circumferential groove;

a second lock plate having a second key-hole shaped opening slidable relative to a second aperture through said mold portion, said second lock pin extendable through said second aperture and said second key-hole shaped opening such that said second lock plate is engageable with said circumferential groove; and an actuator mounted to said first and second lock plate to drive said first and second lock plate between a locked position to secure said first mold portion to said second mold portion and an unlocked position, said first and second lock plate comprise a slot such that said first and second lock plate are movable relative a guide pin extending from said second mold portion.

9. The mold assembly as recited in claim 8, wherein said a first and second pin receives said first and second lock plate in a substantially perpendicular relationship.

10. The mold assembly as recited in claim 8, wherein said first and second male lock pin each includes a frustro-conical portion.

11. The mold assembly as recited in claim 8, wherein said actuator operable to simultaneously drive said first lock plate and said second lock plate between locked position and said unlocked position.

12. The mold assembly are recited in claim 1, wherein said actuator extends to simultaneously drive said first and second lock plates toward said locked position.

13. The mold assembly as recited in claim 8, wherein said actuator extends to simultaneously drive said first and second lock plates toward said locked position.

14. The mold assembly as recited in claim 1, wherein said first and second lock plate and said between said first and second lock plate are located along and edge of said second mold portion.

15. The mold assembly as recited in claim 8, wherein said first and a second lock plate and said actuator between said first and second lock plate are located along an edge of said second mold portion.

* * * * *

UNITED STATES PATENT AND TRADEMARK OFFICE
CERTIFICATE OF CORRECTION

| | |
|---|---|
| PATENT NO. | : 6,702,566 B1 |
| APPLICATION NO. | : 09/864839 |
| DATED | : March 9, 2004 |
| INVENTOR(S) | : Bellasalma et al. |

It is certified that error appears in the above-identified patent and that said Letters Patent is hereby corrected as shown below:

IN THE CLAIMS:

In Claim 1, Column 5, Line 6 of the patent, "fast" should read as --first--

In Claim 1, Column 5, Line 7 of the patent, "female" should read as --male--

In Claim 1, Column 5, Line 12 of the patent, insert --mold-- after "second"

In Claim 1, Column 5, Line 15 of the patent, "moveable" should be --movable--

In Claim 4, Column 5, Line 24 of the patent, insert --wherein-- before "said" and after "claim 1,"

In Claim 6, Column 5, Line 31 of the patent, "respectively" should read as --relatively--

In Claim 6, Column 5, Line 32 of the patent, delete "pin"

In Claim 7, Column 5, Line 38 of the patent, insert --locked-- before "position" and after "said"

In Claim 8, Column 5, Line 43 of the patent, "potion" should read as --portion--

In Claim 8, Column 6, Line 2 of the patent, "pock" should read as --lock--

In Claim 8, Column 6, Line 11 of the patent, insert --second-- before "mold" and after "said"

In Claim 9, Column 6, Line 23 of the patent, delete "a" before "first"

UNITED STATES PATENT AND TRADEMARK OFFICE
CERTIFICATE OF CORRECTION

PATENT NO.       : 6,702,566 B1
APPLICATION NO.  : 09/864839
DATED            : March 9, 2004
INVENTOR(S)      : Bellasalma et al.

It is certified that error appears in the above-identified patent and that said Letters Patent is hereby corrected as shown below:

IN THE CLAIMS:

In Claim 11, Column 6, Line 30 of the patent, insert --said-- after "between" and before "locked"

In Claim 12, Column 6, Line 32 of the patent, "are" should read as --as--

In Claim 14, Column 6, Line 39 of the patent, insert --actuator-- after "said" and before "between"

In Claim 14, Column 6, Line 40 of the patent, "and" should read as --an--

In Claim 15, Column 6, Line 43 of the patent, delete "a" after "and" and before "second"

Signed and Sealed this

Eighth Day of January, 2008

JON W. DUDAS
*Director of the United States Patent and Trademark Office*